United States Patent Office 3,460,987
Patented Aug. 12, 1969

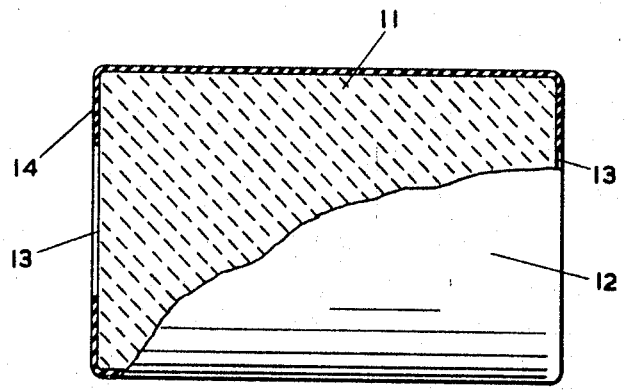
INVENTORS:
PETER WILLIAM McMILLAN
GRAHAM PARTRIDGE describes method for coating ceramic-carbon material.

3,460,987
METHOD OF COATING A CERAMIC-CARBON MATERIAL WITH GLASS AND ARTICLE
Peter William McMillan and Graham Partridge, Stafford, England, assignors to The English Electric Company Limited, London, England, a British company
Filed Oct. 22, 1965, Ser. No. 501,973
Claims priority, application Great Britain, Jan. 27, 1965, 3,577/65
Int. Cl. B44d 1/00; C04b 35/52; H01c 7/02
U.S. Cl. 117—219          15 Claims

ABSTRACT OF THE DISCLOSURE

A block of ceramic-carbon material, for use as a resistor, has its surface (except for those portions to which electrical connections are to be made) coated with an adherent layer of glass or of devitrified glass-ceramic material of certain specific stated compositions.

A process is described by which this is achieved.

The coatings are electrically-insulating, are hard and firmly adherent to the ceramic-carbon blocks, and will withstand high temperatures in operation.

---

This invention relates to a method of coating articles with refractory and/or vitreous materials and to coated articles, and in particular (but not exclusively) to coated articles formed from ceramic-carbon material. Such coated ceramic-carbon articles may for example be used as electrical resistors.

One object of the invention is to provide a novel method of producing a hard electrically-insulating coating on an article, for example on a ceramic-carbon article. Another object is to provide a novel coated article. A further object is to make resistor blocks coated in accordance with the invention to operate at higher temperatures than hitherto.

According to the invention in one aspect, an article having, for example, a ceramic-carbon body is coated with a glass-ceramic or glass insulating coating. According to the invention in another aspect, there is provided a method of producing a glass-ceramic or glass insulating coating on a body of, for example, ceramic-carbon material.

A general example of the method by which a ceramic-carbon article is coated with a glass-ceramic coating will first be described, with reference to the accompanying drawing, which shows diagrammatically a coated ceramic-carbon block for use as a resistor.

It may be mentioned that ceramic-carbon articles are known, for use as electrical resistors. Such articles, which may be obtained as blocks of various shapes, consist of a body of a ceramic resembling fireclay containing a dispersion of carbon. The articles may be obtained with different proportions of carbon, giving different specific resistances, and are obtainable from Morganite Resistors Ltd., Jarrow, Co. Durham, England.

The coefficient of linear thermal expansion of the ceramic-carbon material from which the ceramic-carbon article is made is determined. A glass-ceramic is chosen which has a coefficient of linear thermal expansion lying fairly close to, and preferably within the range 2.5 to $10 \times 10^{-7}$ below, that of the ceramic-carbon material. A test is then conducted to determine the temperature above which the glass, which is to be heat-treated to form the glass-ceramic, wets the ceramic-carbon material. It has been found that the glass does not wet the ceramic-carbon material unless either the ceramic-carbon material is precoated with a silicon compound or silicate or unless the glass contains at least 5 percent by weight of boric oxide ($B_2O_3$). A suitable test comprises placing a small piece of the glass, which has two plane faces at right angles to each other, on a horizontal plane surface of the ceramic-carbon material. Before this is done at least the plane surface of the ceramic-carbon material is precoated with a silicone compound or silicate and is dried at a temperature of less than 110° C. One of the plane surfaces of the piece of glass is in contact with the precoated plane surface of the ceramic-carbon material. The piece of glass and the ceramic-carbon material are placed in a furnace containing a non-oxidising atmosphere. The angle between the two plane faces of the glass is viewed through a telescope and the temperature of the furnace is raised at less than 5° C./min. The angle viewed through the telescope increases above 90° as the glass softens but as the glass begins to wet the coated plane surface of the ceramic-carbon material the angle falls below 90°. The temperature at which the glass begins to wet the surface is noted, and the glass should be chosen so that this temperature is less than that at which the ceramic-carbon material deforms.

If the glass-ceramic composition contains more than 5 percent by weight of $B_2O_3$ it is unnecessary to precoat the ceramic-carbon material. The test is otherwise as described.

A glass suitable for conversion into the chosen glass-ceramic is first prepared in its glass form.

Glasses suitable for the production of glass-ceramic coatings on ceramic-carbon articles, in accordance with the present invention, include, firstly, those having a composition within the range:

|  | Percent |
|---|---|
| $SiO_2$ | 60–75 |
| $Li_2O$ | 8–12 |
| $Al_2O_3$ | 8–12 |
| $P_2O_5$ | 0.5–6.0 |
| $Na_2O$ | 0–5 |
| $K_2O$ | 0–5 |
| $ZnO$ | 0–5 |
| $SrO$ | 0–5 |
| $BaO$ | 0–5 |
| $CaO$ | 0–10 |
| $B_2O_3$ | 0–10 | and in which the content of silica, $SiO_2$, plus that of the lithia, $Li_2O$, the alumina, $Al_2O_3$, and the phosphate, $P_2O_5$, amounts to at least 80% of the total. All percentages are by weight.

Suitable glasses also include, secondly, those having a composition within the range:

|  | Percent |
|---|---|
| $SiO_2$ | 16–32 |
| $Al_2O_3$ | 12–16 |
| $ZnO$ | 43–47 |
| $B_2O_3$ | 10–25 |
| $Li_2O$ | 0–6 |
| $Na_2O$ | 0–6 |
| $K_2O$ | 0–6 |
| $MgO$ | 0–10 |
| $CaO$ | 0–10 |
| $SrO$ | 0–10 |
| $BaO$ | 0–10 | in which the content of silica, $SiO_2$, plus that of the alumina $Al_2O_3$, the zincia $ZnO$ and the boric oxide $B_2O_3$ amounts to at least 80% of the total.

Suitable glasses also include, thirdly, those having a composition within the range:

| | Percent |
|---|---|
| $SiO_2$ | 60–75 |
| $Li_2O$ | 10–15 |
| $Al_2O_3$ | 6–10 |
| MgO | 10–14 |
| $P_2O_5$ | 0.5–6.0 |
| $Na_2O$ | 0–5 |
| $K_2O$ | 0–5 |
| ZnO | 0–5 |
| SrO | 0–5 |
| BaO | 0–5 |
| CaO | 0–10 |
| $B_2O_3$ | 0–10 | and in which the content of silica $SiO_2$, plus that of the lithia $Li_2O$, the alumina $Al_2O_3$, the magnesia MgO, and the phosphate $P_2O_5$, amounts to at least 80% of the total.

It will be understood that, among other factors which influence the choice of glass for the successful production of coated articles in accordance with the invention, the coefficient of linear thermal expansion in the glass-ceramic form must be sufficiently well matched to that of the article being coated.

The glass is then milled and the resultant glass powder is formed into a suspension by mixing it with a suspending agent and an anti-settling agent. Preferably the suspending agent is methylated spirit and the anti-settling agent is a 10 percent ammonia solution in water.

If the glass composition contains no $B_2O_3$, or less than 5 percent by weight of $B_2O_3$, it is essential that the ceramic-carbon article should be precoated with a silicone compound or a silicate. If the glass contains more than 5 percent by weight of $B_2O_3$ it is not necessary to precoat the ceramic-carbon article with a silicone compound or a silicate, though it may be so precoated.

A coating of the glass powder suspension, prepared as described above, is applied to the ceramic-carbon article, precoated if necessary. The coated article is then placed in a furnace having a non-oxidising atmosphere. The temperature of the furnace is raised at a rate of less than 10° C./min to a temperature above that at which the glass wets the surface of the ceramic-carbon article and this temperature is maintained for a sufficient time to completely fuse the powder coating.

In certain cases, in particular with glasses of which the essential constituents are $SiO_2$, $Al_2O_3$, ZnO and $B_2O_3$, it is found that the treatment to fuse the glass powder coating, just described, also results in the devitrification of the glass to form a microcrystalline glass-ceramic.

In other cases, in particular with glasses of which the essential constituents are $SiO_2$, $Li_2O$, $Al_2O_3$ and $P_2O_5$, the article and coating are then subjected to a suitable heat-treatment schedule to devitrify the glass coating.

The preferred heat-treatment schedule consists of maintaining the article at a temperature close to the "Mg point" of the glass to nucleate the glass, preferably for at least one hour, and then maintaining the article at a final crystallization temperature in the range 700–900° C., preferably for at least one hour, until a glass-ceramic product with the desired degree of crystallization is obtained.

It is important that the temperature changes during the heat-treatment schedule should be gradual, e.g. preferably not exceeding 5° C. per minute, since in general only the glass-ceramic has a coefficient of linear thermal expansion matched with that of the ceramic-carbon article, and there may be a considerable difference between the expansion coefficient of the glass which is to be devitrified and the ceramic-carbon article. For the same reason the temperature should not be allowed to fall below the temperature which corresponds to a viscosity of $10^{14.6}$ poise, i.e. the strain point of the glass coating, until the glass is devitrified.

A ceramic-carbon article may be formed, in accordance with the invention, with a coating of glass, rather than of glass-ceramic.

Suitable glass insulating coatings include those having a composition within the following range:

| | Percent |
|---|---|
| $SiO_2$ | 60–70 |
| $Al_2O_3$ | 2–5 |
| $B_2O_3$ | 20–25 |
| $Na_2O$ | 0–5 |
| $K_2O$ | 0–5 |
| ZnO | 0–5 |
| SrO | 0–5 |
| BaO | 0–5 |
| CaO | 0–10 | and in which the content of silica $SiO_2$, plus that of alumina $Al_2O_3$ and boric oxide $B_2O_3$, amounts to at least 80% of the total.

The method by which the ceramic-carbon article is formed with a glass coating is the same as that described above but omitting the heat-treatment. However, in this case, the coefficient of linear thermal expansion of the glass, rather than that of the glass-ceramic, must be adequately matched with the coefficient of linear thermal expansion of the ceramic-carbon article.

In addition to glass and glass-ceramic coatings, mixtures of glass and glass-ceramic powders may be applied to the article to form coatings. Another alternative within the scope of the invention is to apply mixtures of glass and refractory powders. An example of a suitable refractory powder is alumina $Al_2O_3$.

Both when applying a glass coating and when forming a glass-ceramic coating, the glass powder is preferably milled from frit formed by casting molten glass into water. An alternative is to mill broken pieces of glass. The size of the particles of glass powder is preferably such that they pass through a 200's B.S. sieve. The suspension of glass powder is preferably applied to the article by spraying or dipping techniques and is dried at a suitable temperature, for example 50° C.

When a silicone compound or a silicate are applied to the article they are preferably in liquid or grease form and are applied by brushing, spraying or dipping techniques. Preferably the silicone compound or the silicate breaks down to give either silica or a silicate in the surface of the ceramic-carbon article. Examples of suitable silicone compounds or silicates are sodium silicate, "Releasil 7" (trademark) silicone grease, a suspension of colloidal silica in water, and ethyl silicate.

Preferably the atmospheres inside the furnace used for the test to determine wetting temperatures, and inside the furnace used during coating of the ceramic-carbon article are reducing and consist of a mixture of 10 percent hydrogen, 90 percent nitrogen.

The processes have been described as applied to ceramic-carbon materials. Another material which may be coated by a process in accordance with the invention is silicon carbide.

A particular application of the invention is to ceramic-carbon resistor blocks, as shown in the figure. The ceramic-carbon body 11 of the resistor block is cylindrical, and those surfaces parallel to the intended direction of current flow—in this case, the curved surface of the block—have been coated in accordance with the invention with an insulating coating 12, which is found to increase the impulse voltage withstand level. The block is electrically connected in an electrical circuit by means of its flat end surfaces 13. Two or more blocks may be connected in series. The coating may also extend, as shown at 14, over the edges of the block, and the blocks may be connected in series by conducting discs of somewhat smaller diameter.

A number of specific examples of the application of glass and glass-ceramic coatings to ceramic-carbon articles will now be described:

Example 1

A ceramic-carbon article has a coefficient of linear thermal expansion of $57.6 \times 10^{-7}$ ($20°$ C.–$500°$ C.) and is to be coated with a glass-ceramic. A glass-ceramic of Composition A in Table 1 was chosen, which was found to have a coefficient of linear thermal expansion of 50 to $55 \times 10^{-7}$ ($20°$ C.–$500°$ C.).

Molten glass of Composition A was prepared and was cast into cold water to form "frit." The frit was dried, and 500 grams of the dried frit and 1000 grams of 1 inch diameter pebbles were milled in a 6 inch diameter, ½ gallon capacity mill for 16 hours at 7660 revolutions per hour. The resultant powder glass was passed through a 200's B.S. mesh sieve. The powder glass was formed into a suspension using methylated spirit as the suspending agent and a 10 percent ammonia solution in water as the anti-settling agent. A suspension containing:

Powder glass _____ gm__ 200
Methylated spirit _____ ml__ 156
Ammonia solution (10%) _____ ml__ 9 was found to be satisfactory in this case. The powder glass suspension was then applied to ceramic-carbon articles, which had been precoated by spraying with "Releasil 7" (trademark) silicone grease.

The powder-glass-coated ceramic-carbon article was placed in a furnace in which an atmosphere of 10 percent hydrogen, 90 percent nitrogen was maintained. The temperature was raised at a rate of $6–7°$ C. per minute to a temperature of $1125°$ C. This temperature was maintained for 60 minutes to fuse the coating, and the temperature was then allowed to fall at a rate not exceeding $10°$ C. per minute to a temperature of $850°$ C., which temperature was held for 60 minutes, to devitrify the glass. The furnace temperature was then reduced at a rate not exceeding $10°$ C. per minute to room temperature. The glass-ceramic coating on the ceramic-carbon article was smooth and free from cracks and was adherent to the ceramic-carbon article.

TABLE 1

| | Composition, percent by weight | | | | | |
|---|---|---|---|---|---|---|
| | A | B | C | D | E | F |
| $SiO_2$ | 71.3 | 64.1 | 66.3 | 26.3 | 21.3 | 64.7 |
| $Li_2O$ | 10.4 | 9.4 | | | | 12.9 |
| $Al_2O_3$ | 10.4 | 9.3 | 3.5 | 14.0 | 14.0 | 7.7 |
| $B_2O_3$ | | 10.0 | 21.7 | 15.0 | 20.0 | |
| $ZnO$ | 2.1 | 1.9 | | 44.7 | 44.7 | |
| $MgO$ | | | | | | 11.7 |
| $P_2O_5$ | 2.6 | 2.4 | | | | 3.0 |
| $CaO$ | | | 0.6 | | | |
| $K_2O$ | 3.2 | 2.9 | 3.7 | | | |
| $Na_2O$ | | | 4.2 | | | |

Example 2

The process of Example 1 was repeated up to the stage of producing a powder-glass-coated ceramic-carbon article, and this was fired at a temperature of $1125°$ C. for 60 minutes to fuse the coating. The temperature was then allowed to fall at a rate not exceeding $10°$ C./min. to a nucleation temperature of $550°$ C. which temperature was held for 60 minutes. The temperature was then raised at a rate not exceeding $5°$ C. per minute to a temperature of $850°$ C., and this temperature was maintained for 60 minutes to devitrify the glass. The temperature was then allowed to fall at a rate not exceeding $10°$ C. per minute to room temperature. An atmosphere of 10 percent hydrogen, 90 percent nitrogen was maintained throughout the process. The glass-ceramic coating on the ceramic-carbon article was smooth and free from cracks and was adherent to the ceramic-carbon article.

Example 3

A ceramic-carbon article having a coefficient of thermal expansion of $57.6 \times 10^{-7}$ ($20°$ C.–$500°$ C.) was to be coated. A glass-ceramic of Composition B in Table 1 was chosen, which was found to have a thermal expansion coefficient of $56.0 \times 10^{-7}$ ($20°$ C.–$500°$ C.).

Glass "frit" of Composition B was milled under the same conditions as in Example 1 to give a powder glass which passed through a 200's B.S. mesh sieve. The powder glass was formed into a suspension containing:

Powder glass _____ gm__ 150
Methylated spirit _____ ml__ 141
Ammonia solution (10%) _____ ml__ 7

The powder glass suspension was sprayed directly onto the ceramic-carbon article.

The coated ceramic-carbon article was placed in a furnace in an atmosphere of 10 percent hydrogen, 90 percent nitrogen. The furnace temperature was raised at a rate of $6°$ to $7°$ per minute to $1000°$ C. which temperature was maintained for 60 minutes to fuse the coating, before lowering the temperature at less than $10°$ C. per minute to $750°$ C. The temperature was held at $750°$ C. for 60 minutes to devitrify the glass and was then lowered at less than $10°$ C. per minute to room temperature. The glass-ceramic coating was adherent to the ceramic-carbon article and was smooth and free from cracks.

Example 4

A ceramic-carbon article having a coefficient of thermal expansion of $58.9 \times 10^{-7}$ ($20°$ C'.–$400°$ C.) was to be coated. A glass of Composition C in Table 1 was chosen, which was found to have a thermal expansion coefficient of $50 \pm 1 \times 10^{-7}$ ($20–400°$ C.).

Glass cullet of Composition C was milled to glass powder which passed through a 200's B.S. mesh sieve. A suspension of the glass powder was formed containing:

Powder glass _____ gm__ 200
Methylated spirit _____ ml__ 121
Ammonia solution (10%) _____ ml__ 9

The suspension was sprayed directly onto the ceramic-carbon article.

The coated ceramic-carbon material was placed in a furnace in an atmosphere of 10 percent hydrogen, 90 percent nitrogen. The temperature was raised at a rate of $6°$ to $70°$ C. per minute to a temperature of $900°$ C. which was maintained for 2 hours. The temperature was then lowered at a rate not exceeding $10°$ C. per minute to room temperature. The glass coating was firmly adherent to the ceramic-carbon article and was smooth and free from cracks.

Example 5

A ceramic-carbon article having a coefficient of thermal expansion of $42.0 \times 10^{-7}$ ($20–400°$ C.) was to be coated. A glass-ceramic of Composition D in Table 1 was chosen, which was found to have a thermal expansion coefficient of $40.9 \times 10^{-7}$ ($20–400°$ C.).

Glass frit of Composition D was milled under the same conditions as in Example 1 to give a powder glass which passed through a 200's B.S. mesh sieve. The powder glass was formed into a suspension containing:

Powder glass _____ gm__ 200
Methylated spirit _____ ml__ 80
Ammonia solution (10%) _____ ml__ 9

The powder glass suspension was applied to the ceramic-carbon article using a flow coating technique in which the parts of the article to be coated were immersed in the suspension.

The coated ceramic-carbon article was placed in a furnace in an atmosphere of 10 percent hydrogen, 90 percent nitrogen. The furnace temperature was raised at a rate not exceeding $5°$ C. per minute to a temperature of $1000°$ C. which temperature was maintained for 2 hours to fuse the coating. The coating was also devitrified during this process. The furnace temperature was then allowed to fall at a rate not exceeding 10° C. per minute to room temperature. The glass-ceramic coating on the ceramic-carbon article was white, smooth and free from cracks and was adherent to the ceramic-carbon article.

Example 6

A ceramic-carbon article having a coefficient of thermal expansion of $43.8 \times 10^{-7}$ (20–400° C.) was to be coated. A glass-ceramic of Composition E in Table 1 was chosen, which was found to have a thermal expansion coefficient of $39.6 \times 10^{-7}$ (20–400° C.).

Glass frit of Composition E was milled under the same conditions as in Example 1 to give a powder glass which passed through a 200's B.S. mesh sieve. The powder glass was formed into a suspension containing:

Powder glass _____ gm__ 200
Methylated spirit _____ ml__ 100
Ammonia solution (10%) _____ ml__ 9

The powder glass suspension was applied to the ceramic-carbon article using a flow coating technique in which the parts of the article to be coated were immersed in the suspension.

The coated ceramic-carbon article was fired to the same conditions as given in Example 5. The glass-ceramic coating on the ceramic-carbon article was white, smooth and free from cracks and was adherent to the ceramic-carbon article.

Example 7

A ceramic-carbon article having a coefficient of thermal expansion of $56.1 \times 10^{-7}$ (20–400° C.) was to be coated. A glass of Composition C was chosen.

Glass cullet of this composition was milled to give glass powder which passed through a 200's B.S. mesh sieve. A suspension of the glass powder was formed containing:

Powder glass _____ gm__ 200
Methylated spirit _____ ml__ 141
Ammonia solution (10%) _____ ml__ 9

The powder glass suspension was applied to the ceramic-carbon article using a flow coating technique in which the parts of the article to be coated were immersed in the suspension.

The coated ceramic-carbon article was placed in a furfurnace in an atmosphere of 10 percent hydrogen, 90 percent nitrogen. The furnace temperature was raised at a rate not exceeding 5° C. per minute to a temperature of 825° C. which temperature was maintained for 2 hours to fuse the coating. The furnace temperature was then allowed to fall at a rate not exceeding 5° C. per minute to room temperature. The glass coating was firmly adherent to the ceramic-carbon article and was smooth and free from cracks.

Example 8

A ceramic-carbon article having a coefficient of thermal expansion of $57.8 \times 10^{-7}$ (20–400° C.) was to be coated. A glass of Composition C was chosen.

The glass was milled to form powder, applied to the ceramic-carbon article and fired to the same conditions as in Example 7. The glass coating was firmly adherent to the ceramic-carbon article and was smooth and free from cracks.

Example 9

A ceramic-carbon article having a coefficient of thermal expansion of $60.6 \times 10^{-7}$ (20–400° C.) was to be coated. A glass of Composition C was chosen.

The glass was milled to form powder, applied to the ceramic-carbon and fired to the same conditions as in Example 7. The glass coating was firmly adherent to the ceramic-carbon article and was smooth and free from cracks.

A further example of a glass-ceramic suitable for coating a ceramic-carbon article having a coefficient of thermal expansion of greater than $60 \times 10^{-7}$ (20–400° C.) is Composition F of Table 1. This was found to have a coefficient of thermal expansion of $63.8 \times 10^{-7}$ (20–500° C.). The article would be coated with powder glass as described above, and heated slowly to a suitable temperature to fuse the coating, e.g. 1200° C., which may be maintained for at least 30 minutes. The temperature may then be allowed to fall at a rate not exceeding 10° C. per minute to 560° C., which is held for 2 hours to nucleate the glass. The temperature is then raised at not more than 10° C. per minute, and preferably at a slower rate, to 850° C., which is maintained for 90 minutes to devitrify the glass. The temperature is then reduced at not more than 10° C. per minute to room temperature.

What is claimed is:

1. An article comprising a refractory conductive body at least partially coated with a glass-ceramic insulating coating having a coefficient of linear thermal expansion close to that of said body and a composition free of lead and fluorine and including by weight, at least 60% $SiO_2$, 6% $Al_2O_3$ and 0–25% $B_2O_3$, an intermediate layer of a silicone compound or silicate being disposed between said body and said insulating coating.

2. An article comprising a refractory conductive body at least partially coated with a glass-ceramic insulating coating having a coefficient of linear thermal expansion close to that of said body and a composition free of lead and fluorine and including by weight, at least 60% $SiO_2$, at least 6% $Al_2O_3$ and 5–25% $B_2O_3$, said coating being in intimate direct contact with said body.

3. An article comprising a refractory conductive body having a coefficient of linear thermal expansion in the range 50 to $65 \times 10^{-7}$ at least partially coated with a glass-ceramic insulating coating having a composition within the following range, the silica content plus that of the lithia, alumina and phosphate amounting to at least 80% of the total:

| | Percent |
|---|---|
| $SiO_2$ | 60–75 |
| $Li_2O$ | 8–12 |
| $Al_2O_3$ | 8–12 |
| $P_2O_5$ | 0.5–6.0 |
| $Na_2O$ | 0–5 |
| $K_2O$ | 0–5 |
| $ZnO$ | 0–5 |
| $SrO$ | 0–5 |
| $BaO$ | 0–5 |
| $CaO$ | 0–10 |
| $B_2O_3$ | 0–10 |

4. An article comprising a refractory conductive body having a coefficient of linear thermal expansion in the range 50 to $60 \times 10^{-7}$ at least partially coated with a glass insulating coating having a composition within the following range, the silica content plus that of the alumina and boric oxide amounting to at least 80% of the total:

| | Percent |
|---|---|
| $SiO_2$ | 60–70 |
| $Al_2O_3$ | 2–5 |
| $B_2O_3$ | 20–25 |
| $Na_2O$ | 0–5 |
| $K_2O$ | 0–5 |
| $ZnO$ | 0–5 |
| $SrO$ | 0–5 |
| $BaO$ | 0–5 |
| $CaO$ | 0–10 |

5. An article comprising a refractory conductive body having a coefficient of linear thermal expansion in the range 40 to $50 \times 10^{-7}$ at least partially coated wtih a glass-ceramic insulating coating having a composition within the following range, the silica content plus that of the alumina, zincia and boric oxide amounting to at least 80% of the total:

| | Percent |
|---|---|
| $SiO_2$ | 16–32 |
| $Al_2O_3$ | 12–16 |
| ZnO | 43–47 |
| $B_2O_3$ | 10–25 |
| $Li_2O$ | 0–6 |
| $Na_2O$ | 0–6 |
| $K_2O$ | 0–6 |
| MgO | 0–10 |
| CaO | 0–10 |
| SrO | 0–10 |
| BaO | 0–10 |

6. An article comprising a refractory conductive body having a coefficient of linear thermal expansion in the range $65$–$75 \times 10^{-7}$ at least partially coated with a glass-ceramic insulating coating having a composition within the following range, the silica content plus that of the lithia, alumina, magnesia and phosphate amounting to at least 80% of the total:

| | Percent |
|---|---|
| $SiO_2$ | 60–75 |
| $Li_2O$ | 10–15 |
| $Al_2O_3$ | 6–10 |
| MgO | 10–14 |
| $P_2O_5$ | 0.5–6.0 |
| $Na_2O$ | 0–5 |
| $K_2O$ | 0–5 |
| ZnO | 0–5 |
| SrO | 0–5 |
| BaO | 0–5 |
| CaO | 0–10 |
| $B_2O_3$ | 0–10 |

7. A process for coating a refractory conductive body with a glass-ceramic insulating coating, comprising the steps of preparing a glass having a composition free of lead and fluorine and including by weight at least 60% $SiO_2$, at least 6% $Al_2O_3$ and 0–25% $B_2O_3$, said composition being such that the resulting glass-ceramic will have a coefficient of linear thermal expansion close to that of said body; making a powder of said glass; preparing a suspension of the glass powder; pre-coating at least part of the surface of the body with an intermediate layer of a silicone compound or silicate; applying said suspension over said intermediate layer; and heating the resulting coated body whereby to fuse the glass powder and devitrify the fused coating.

8. A process for coating a refractory conductive body with a glass-ceramic insulating coating, comprising the steps of preparing a glass having a composition free of lead and fluorine and including by weight at least 60% $SiO_2$, at least 6% $Al_2O_3$ and 5–25% $B_2O_3$, said composition being such that the resulting glass-ceramic will have a coefficient of linear thermal expansion close to that of said body; making a powder of said glass; preparing a suspension of the glass powder; applying said suspension directly to the body so as to at least partially coat the body; and heating the resulting coated body whereby to fuse the glass powder and devitrify the fused coating.

9. A process for coating a refractory conductive article with a glass-ceramic insulating coating comprising the steps of preparing a glass having a composition within the following range, the silica content plus that of the lithia, alumina and phosphate amounting to at least 80% of the total:

| | Percent |
|---|---|
| $SiO_2$ | 60–75 |
| $Li_2O$ | 8–12 |
| $Al_2O_3$ | 8–12 |
| $P_2O_5$ | 0.5–6.0 |
| $Na_2O$ | 0–5 |
| $K_2O$ | 0–5 |
| ZnO | 0–5 |
| SrO | 0–5 |
| BaO | 0–5 |
| CaO | 0–10 |
| $B_2O_3$ | 0–5 | and said glass composition being selected so that the resulting glass-ceramic has a coefficient of thermal expansion close to that of the article, making a powder of said glass, preparing a suspension of said glass powder, pre-coating said article with a silicon compound over at least part of its surface, coating said part of the surface of said article with said suspension, and heating the resultant coated article to fuse the glass powder coating and to devitrify the fused glass coating.

10. A process as claimed in claim 9, wherein the step of heating the coated article comprises heating it to a temperature of over 900° C. but less than that at which the material of the article deforms and maintaining it at this temperature for long enough to fuse the glass powder coating, and subsequently maintaining said article at a temperature in the range 700–900° C. for long enough to devitrify the glass.

11. A process for coating a refractory conductive body with a glass insulating coating, comprising the step of preparing a glass having a composition within the following range, the silica content plus that of the alumina and boric oxide amounting to at least 80% of the total:

| | Percent |
|---|---|
| $SiO_2$ | 60–70 |
| $Al_2O_3$ | 2–5 |
| $B_2O_3$ | 20–25 |
| $Na_2O$ | 0–5 |
| $K_2O$ | 0–5 |
| ZnO | 0–5 |
| SrO | 0–5 |
| BaO | 0–5 |
| CaO | 0–10 | making a powder of said glass, preparing a suspension of the glass powder; coating said body with the suspension over at least part of its surface; and heating the resulting coated body to fuse the glass powder coating.

12. A process for coating a refractory conductive article with a glass-ceramic insulating coating comprising the steps of preparing a glass having a composition within the following range, the silica content plus that of the alumina, zincia and boric oxide amounting to at least 80% of the total:

| | Percent |
|---|---|
| $SiO_2$ | 16–32 |
| $Al_2O_3$ | 12–16 |
| ZnO | 43–47 |
| $B_2O_3$ | 10–25 |
| $Li_2O$ | 0–6 |
| $Na_2O$ | 0–6 |
| $K_2O$ | 0–6 |
| MgO | 0–10 |
| CaO | 0–10 |
| SrO | 0–10 |
| BaO | 0–10 | and said composition being selected so that the resulting glass-ceramic has a coefficient of thermal expansion close to that of the article, making a powder of said glass, preparing a suspension of said glass powder, coating said article with said suspension over at least part of its surface, and heating the resultant coated article to fuse the glass powder coating and to devitrify the fused glass coating.

13. A process as claimed in claim 12, wherein the step of heating the coated article comprises heating it to a temperature in the range 900–1100° C., but less than that at which the material of the article deforms, and maintaining it at this temperature for long enough to fuse the glass powder coating and to devitrify said glass.

14. A process for coating a refractory conductive article with a glass-ceramic insulating coating comprising the steps of preparing a glass having a composition within the following range, the silica content plus that of the lithia, alumina, magnesia and phosphate amounting to at least 80% of the total:

|  | Percent |
|---|---|
| $SiO_2$ | 60–75 |
| $Li_2O$ | 10–15 |
| $Al_2O_3$ | 6–10 |
| $MgO$ | 10–14 |
| $P_2O_5$ | 0.5–6.0 |
| $Na_2O$ | 0–5 |
| $K_2O$ | 0–5 |
| $ZnO$ | 0–5 |
| $SrO$ | 0–5 |
| $BaO$ | 0–5 |
| $CaO$ | 0–10 |
| $B_2O_3$ | 0–10 | and said composition being selected so that the resulting glass-ceramic has a coefficient of thermal expansion close to that of the article, making a powder of said glass, preparing a suspension of said glass powder, coating said article with said suspension over at least part of its surface, and heating the resultant coated article to fuse the glass powder coating and to devitrify the fused glass coating.

15. A process as claimed in claim 14 wherein the step of heating the coated article comprises heating it to a temperature over 1000° C. but less than that at which the material of the article deforms, and maintaining it at this temperature for long enough to fuse the glass powder coating, and subsequently maintaining it at a temperature in the range 700–900° C. for long enough to devitrify said glass.

References Cited

UNITED STATES PATENTS

| 1,948,382 | 2/1934 | Johnson | 117—228 X |
| 3,249,460 | 5/1966 | Gerry | 117—228 X |

FOREIGN PATENTS

| 121,194 | 7/1927 | Switzerland. |
| 155,282 | 2/1954 | Australia. |

WILLIAM L. JARVIS, Primary Examiner

U.S. Cl. X.R.

106—46, 47, 49; 117—121, 135, 201, 222, 228, 229; 338—308